United States Patent
Frommann et al.

(10) Patent No.: US 10,434,906 B2
(45) Date of Patent: *Oct. 8, 2019

(54) METHOD AND SYSTEM FOR CONTROLLING AN ACTUATOR FOR A LOADING AREA ADJUSTABLY MOUNTED ON A MOTOR VEHICLE BODY

(71) Applicant: GM GLOBAL TECHNOLOGY OPERATIONS LLC, Detroit, MI (US)

(72) Inventors: Markus Frommann, Bingen am Rhein (DE); Oleg Mazur, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/051,065

(22) Filed: Feb. 23, 2016

(65) Prior Publication Data
US 2016/0243964 A1 Aug. 25, 2016

(30) Foreign Application Priority Data
Feb. 23, 2015 (DE) .......................... 10 2015 002 114

(51) Int. Cl.
*B60N 2/427* (2006.01)
*B60N 2/42* (2006.01)
(Continued)

(52) U.S. Cl.
CPC ......... *B60N 2/4279* (2013.01); *B60N 2/4214* (2013.01); *B60N 2/42736* (2013.01);
(Continued)

(58) Field of Classification Search
CPC .............. B60N 2/4214; B60N 2/42736; B60N 2/4279; B60R 2021/01252; B60R 21/0134; B60R 21/0136; B60R 21/01516
(Continued)

(56) References Cited

U.S. PATENT DOCUMENTS 5,466,001 A * 11/1995 Gotomyo ................. B60N 2/02
 280/730.1
8,434,819 B2 * 5/2013 Guerrero .............. B60N 2/4221
 297/216.1
(Continued)

FOREIGN PATENT DOCUMENTS

DE 4415467 C1 11/1995
DE 10008972 A1 * 9/2001 ........... B60N 2/4221
(Continued)

OTHER PUBLICATIONS

United States Patent Office, United States Non-Final Office Action for U.S. Appl. No. 15/051,049, dated Apr. 24, 2017.
(Continued)

*Primary Examiner* — Angelina Shudy
(74) *Attorney, Agent, or Firm* — Lorenz & Kopf, LLP

(57) ABSTRACT

A method and a system are provided to control an actuator for exerting forces upon a loading area, particularly a vehicle seat, in an adjusting direction, especially a longitudinal vehicle direction extending from a front end of the vehicle to a tail end of the vehicle. The loading area is mounted on a body of a motor vehicle, particularly a passenger car, such that it can be adjusted in the adjusting direction. An imminent collision of the motor vehicle is detected, and an actuator is driven in order to accelerate the loading area in the adjusting direction prior to the imminent collision in the event an imminent collision is detected.

16 Claims, 2 Drawing Sheets

(51) Int. Cl.
*B60R 21/0136* (2006.01)
*B60R 21/0134* (2006.01)
*B60R 21/015* (2006.01)
*B60R 21/01* (2006.01)

(52) U.S. Cl.
CPC ...... *B60R 21/0134* (2013.01); *B60R 21/0136* (2013.01); *B60R 21/01516* (2014.10); *B60R 2021/01252* (2013.01)

(58) Field of Classification Search
USPC .......................................................... 701/45
See application file for complete search history.

(56) References Cited

U.S. PATENT DOCUMENTS

| | | | |
|---|---|---|---|
| 8,442,726 B2 | 5/2013 | Zimmermann et al. | |
| 2002/0177934 A1 | 11/2002 | Yokota et al. | |
| 2004/0195030 A1* | 10/2004 | Eberle | B60R 21/013 180/271 |
| 2006/0001298 A1* | 1/2006 | Tsuruta | B60N 2/0276 297/216.16 |
| 2007/0185635 A1 | 8/2007 | Mattes et al. | |
| 2008/0162002 A1* | 7/2008 | Bacher | B60N 2/0232 701/45 |
| 2008/0258521 A1* | 10/2008 | Gumprecht | B60N 2/0276 297/216.15 |
| 2011/0133529 A1* | 6/2011 | Guerrero | B60N 2/4221 297/216.18 |
| 2011/0221247 A1* | 9/2011 | Hashimoto | B60N 2/0232 297/216.13 |
| 2011/0291448 A1 | 12/2011 | Hashimoto | |
| 2012/0173085 A1 | 7/2012 | Hillberer et al. | |
| 2012/0265407 A1* | 10/2012 | Zimmermann | B60N 2/4221 701/45 |
| 2014/0336880 A1* | 11/2014 | Freienstein | B60R 21/0132 701/45 |
| 2015/0360614 A1* | 12/2015 | Frommann | B60R 1/00 348/148 |
| 2016/0176322 A1* | 6/2016 | Frommann | B60N 2/42709 701/45 |
| 2016/0243963 A1* | 8/2016 | Frommann | B60R 21/01516 |
| 2017/0028960 A1* | 2/2017 | Kobayashi | B60N 2/42 |
| 2017/0036565 A1* | 2/2017 | Ohno | B60N 2/06 |

FOREIGN PATENT DOCUMENTS

| | | |
|---|---|---|
| DE | 102006051240 A1 | 5/2008 |
| DE | 102011122384 A1 | 9/2012 |
| DE | 102011102093 A1 | 11/2012 |
| DE | 102011108918 A1 | 1/2013 |
| DE | 102011122203 A1 | 6/2013 |
| DE | 102012004007 A1 | 8/2013 |
| DE | 102014005572 A1 | 11/2014 |
| DE | 102013009717 A1 | 12/2014 |

OTHER PUBLICATIONS

German Patent Office, German Search Report for German Application No. 102015002114.1, dated May 19, 2015.

* cited by examiner

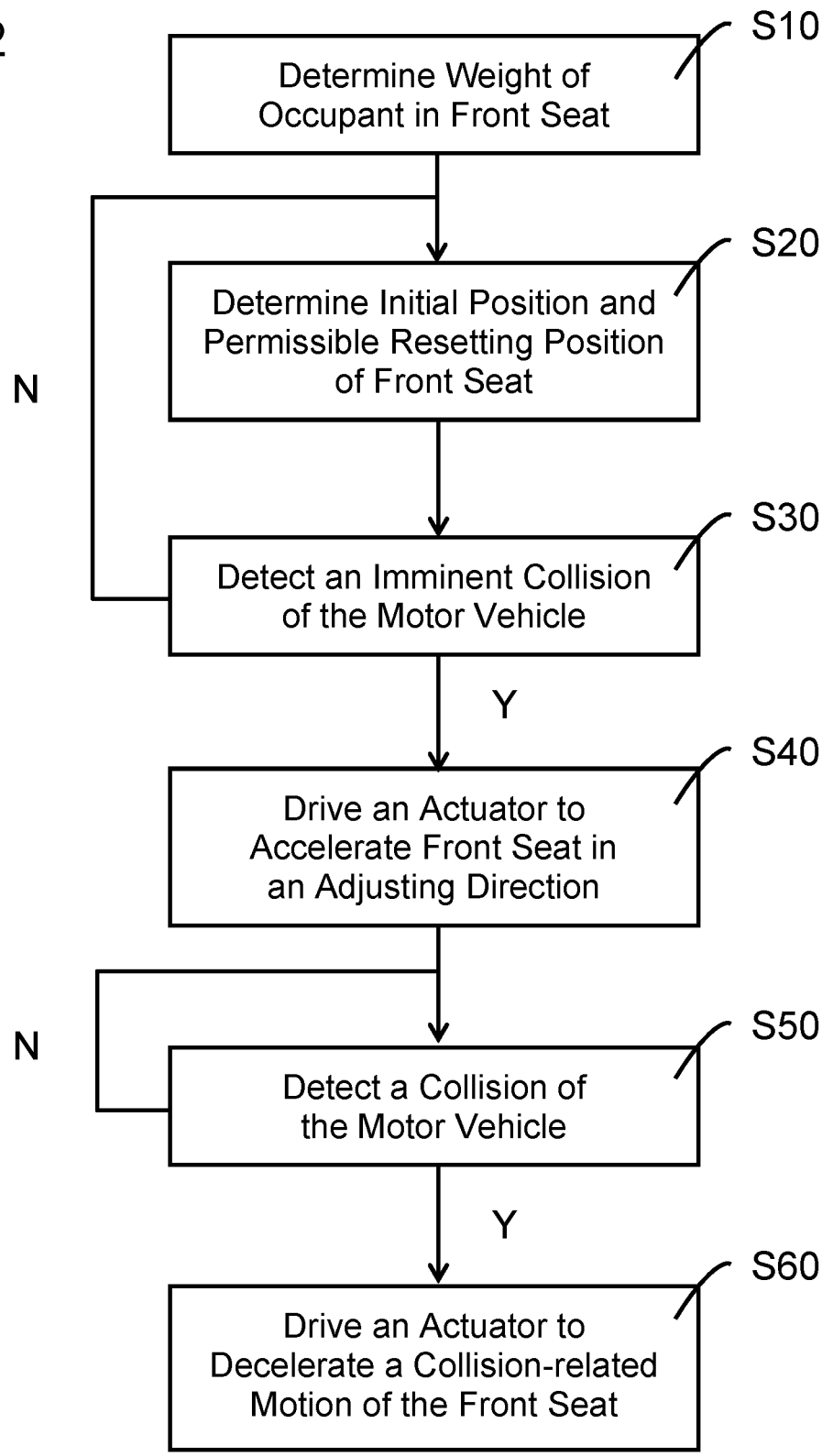

METHOD AND SYSTEM FOR CONTROLLING AN ACTUATOR FOR A LOADING AREA ADJUSTABLY MOUNTED ON A MOTOR VEHICLE BODY

CROSS-REFERENCE TO RELATED APPLICATION

This application claims priority to German Patent Application No. 102015002114.1, filed Feb. 23, 2015, which is incorporated herein by reference in its entirety.

TECHNICAL FIELD

The present disclosure pertains to a method and a system for controlling an actuator for exerting forces upon a loading area, which is adjustably mounted on a body of a motor vehicle, as well as to a motor vehicle with such a system and a computer program product for carrying out the corresponding method.

BACKGROUND

DE 44 15 467 C1 discloses a safety belt device for motor vehicles with a vehicle seat, which is displaceably arranged relative to the vehicle body and, in the event of an impact, pyrotechnically caused to carry out a compulsory motion opposite to the direction of impact. A belt retractor, a damping element and an elastic wire cable are adapted to one another in such a way that a subsequent motion in the direction of impact is decelerated as gently as possible.

SUMMARY

An embodiment of the present disclosure is based on the objective of protecting a live load, particularly a vehicle occupant, during a collision of the motor vehicle. According to an aspect of the present disclosure, a motor vehicle, particularly a passenger car, features a vehicle body, a loading area, particularly a vehicle seat or a loading surface for transporting goods, which is mounted on the vehicle body such that it can be adjusted in an adjusting direction, particularly on guide rails. An actuator, which may be electromotive, electromagnetic, pneumatic and/or hydraulic, is controlled electrically, and activated, in particular electronically, pneumatically and/or hydraulically in order to exert forces upon the loading area in the adjusting direction. A system for controlling the actuator is also disclosed. In an embodiment, the adjusting direction extends in a longitudinal vehicle direction from a front end of the vehicle to a tail end of the vehicle or in a lateral vehicle direction from one side of the vehicle to an opposite side of the vehicle or both longitudinal and lateral directions.

According to an aspect of the present disclosure, a method for controlling the actuator for exerting forces upon the loading area in the adjusting direction is disclosed. An imminent collision of the motor vehicle is detected. The actuator is activated in order to accelerate the loading area in the adjusting direction prior to the imminent collision, particularly to cause the loading area to carry out a controlled compulsory motion relative to the vehicle body in the adjusting direction, in response to detection of an imminent collision.

The system according to an aspect of the present disclosure is designed for carrying out a method described herein and/or features a sensor configured to detect an imminent collision of the motor vehicle and a controller configured to activate an actuator for accelerating the loading area in the adjusting direction prior to the imminent collision, particularly to cause the loading area to carry out a controlled compulsory motion relative to the vehicle body in the adjusting direction, in the event an imminent collision is detected.

In an embodiment, the sensor is configure to detect an imminent collision optically, by means of radar and/or ultrasound, based on a brake application, by means of communication between motor vehicles or the like. In an embodiment, the system may feature one or more such sensors for this purpose.

In an embodiment, the controller drives or is configured to drive this actuator, in particular, in a position-, speed-, acceleration- and/or force-controlled fashion, particularly-regulated fashion, in such a way that it respectively accelerates the loading area in the adjusting direction, particularly relative to the vehicle body, on which the loading area is mounted, and/or inertial or absolute or relative to the vehicle surroundings or causes the loading area to carry out a compulsory motion relative to the vehicle body or exerts corresponding forces upon the loading area, especially on the basis of a predefined position-, speed-, acceleration- or force profile, particularly on the basis of a predefined nominal position, nominal speed, nominal acceleration or nominal force. The controller may transmit, in particular, varying nominal values to the actuator in this case.

In an embodiment, an inertial or absolute speed and therefore a kinetic energy of the loading area and its live load, for example an occupant of a vehicle seat, to be dissipated can be reduced in the instant of the collision due to this particularly positive acceleration or compulsory relative motion relative to the vehicle body in the adjusting direction prior to the imminent collision. In an embodiment, a stopping distance for respectively decreasing the absolute speed or dissipating the kinetic energy may additionally or alternatively be extended during or as a result of the collision. In an embodiment, the live load may additionally or alternatively be "pre-accelerated" in the adjusting direction, particularly in the lateral vehicle direction, such that a subsequent collision-related acceleration is reduced.

In an embodiment, the additionally created stopping distance and/or the respective decrease of the absolute speed or dissipation of the kinetic energy and/or a correspondingly occurring stress, particularly of the loading area and/or its live load, can be optimized, especially adapted to marginal conditions, particularly the accident situation and/or live load, by driving an actuator in accordance with a predefined profile and/or with, in particular, varying nominal values.

As a result of the collision, the vehicle body can be subjected to a typically significant positive acceleration absolute or relative to the vehicle surroundings in the adjusting direction, particularly to a typically vehement deceleration of its absolute speed. Consequently, the loading area can carry out a collision-related motion relative to the vehicle body opposite to the adjusting direction.

In an embodiment, the controller drives or is configured to drive this actuator subsequent to a motion of the loading area relative to the vehicle body in the adjusting direction, which is taken place prior to the collision, particularly in a phase, in which the vehicle body is subjected to a collision-related positive acceleration in the adjusting direction and a forward motion of the vehicle body opposite to the longitudinal vehicle direction is decelerated, in order to influence a collision-related motion of the loading area relative to the vehicle body, on which it is mounted, opposite to the adjusting direction, particularly to respectively decelerate or slow down a collision-related displacement of the loading area toward the front and/or side of the vehicle in a controlled fashion.

In an embodiment, the controller drives or is configured to drive this actuator in a phase, in which the vehicle body is subjected to a collision-related positive acceleration in the adjusting direction and/or the loading area carries out a collision-related motion relative to the vehicle body opposite to the adjusting direction, in particular, in a position-, speed-, acceleration- and/or force-controlled fashion, particularly-regulated fashion, in such a way that it influences, particularly decelerates, the collision-related motion of the loading area relative to the vehicle body or exerts corresponding forces upon the loading area, especially on the basis of a predefined position-, speed-, acceleration- or force profile, particularly on the basis of a predefined nominal position, nominal speed, nominal acceleration or nominal force. The controller may transmit, in particular, varying nominal values to the actuator in this case.

In an embodiment, the respective decrease of the absolute velocity or dissipation of the kinetic energy and/or a correspondingly occurring stress, particularly of the loading area and/or its live load, can be respectively optimized as a result of or after the collision, especially adapted to marginal conditions, particularly the accident situation and/or live load, by driving the actuator in accordance with a predefined profile in the phase, in which the vehicle body is subjected to a collision-related acceleration in the adjusting direction.

In an embodiment, the controller also drives or is configured to drive this actuator past a collision-related standstill of the motor vehicle, especially during a subsequent, particularly positive acceleration of the motor vehicle or the vehicle body in the adjusting direction, in order to influence an especially collision-related motion of the loading area relative to the vehicle body, particularly opposite to the adjusting direction. In this way, the stopping distance of the loading area and the correspondingly occurring stresses can in an embodiment also be further optimized after a collision-related standstill of the motor vehicle. In an embodiment, a so-called rebound or elastic spring-back of the motor vehicle or its vehicle body in the adjusting direction particularly can also be at least partially compensated.

In an embodiment, a corresponding permissible resetting distance of the loading area in the adjusting direction is determined before and/or during the acceleration of the loading area in the adjusting direction prior to the imminent collision or correspondingly driving the actuator and the actuator is driven on the basis of this determined permissible resetting distance, especially such that it does not exceed this resetting distance.

In an embodiment, the system is configured to determine a permissible resetting distance of the loading area in the adjusting direction. The controller is configured to drive the actuator on the basis of the determined permissible resetting distance, especially such that it does not exceed this resetting distance.

In an embodiment, the permissible resetting distance is determined on the basis of an interior monitoring system that is arranged stationary referred to the vehicle body or the loading area, particularly on a rear side of the vehicle seat, and/or on the basis of an especially weight-based or force-based occupancy detection system for another loading area arranged behind the loading area in the adjusting direction, particularly another vehicle seat that is arranged behind the vehicle seat in the longitudinal vehicle direction. In this way, a maximally available resetting distance can in an embodiment be determined beforehand and/or during the acceleration in the adjusting direction and thereby utilized to the greatest extent possible. A negative impact on persons and/or objects located behind the loading area, especially the vehicle seat, can be additionally or alternatively reduced, particularly prevented.

In an enhancement, the controller drives or is configured to drive the actuator on the basis of the determined permissible resetting distance in order to respectively minimize an absolute speed of the loading area and/or to maximize an extended resetting distance in the instant of the collision, particularly in an instant of the collision that was calculated beforehand based on the detected imminent collision, such that an absolute speed of the loading area is minimized and/or an extended resetting distance is maximized in the instant of the collision. An acceleration or motion of the loading area depends on the weight of the loading area and a live load that is arranged on and moved together with the loading area, particularly the weight of an occupant of a vehicle seat.

In an embodiment, the system therefore is configured to determine the weight of a live load arranged on the loading area, particularly the weight of an occupant of the vehicle seat, wherein the means for driving the actuator respectively drives or is designed for driving the actuator on the basis of the determined weight of the live load.

In an embodiment, the actuator can be driven, in particular, such that a greater force is exerted if a higher weight of the live load has been determined, particularly if the determined weight of the live load exceeds a predefined upper limiting value, a comparatively lower force is exerted if a comparatively lower weight of the live load has been determined, particularly if the determined weight of the live load falls short of the predefined upper limiting value, and no forces at all are exerted if the determined weight of the live load falls short of a predefined lower limiting value.

In an embodiment, the controller is configured to drive this actuator on the basis of a predefined permissible acceleration, particularly a maximum acceleration. In this way, a stress of the loading area and its live load, particularly a vehicle occupant, can in an embodiment be optimized to the greatest extent possible during the acceleration in the adjusting direction prior to the collision and/or during the subsequent motion relative to the vehicle body after the collision, particularly also during a rebound.

In an embodiment, the system is configured to determine an initial position of the loading area before the acceleration in the adjusting direction prior to the imminent collision. In particular, the system is configured to determine an initial position of the loading area relative to the vehicle body, and the controller is configured to drive the actuator on the basis of the determined initial position, particularly in such away that the loading area overshoots the determined initial position by no more than a predefined distance, especially such that it does not overshoot the determined initial position. In an embodiment, this makes it possible to lower the risk of the loading area and/or its live load, particularly a vehicle occupant, being negatively impacted by components arranged in front thereof such as, e.g., a steering wheel, a dashboard, a backrest of another vehicle seat or the like due to the controlled compulsory motion of the loading area relative to the vehicle body as a result of the collision.

In an embodiment, the system is configured to detect when collision has taken place, and the controller drives or is configured to drive this actuator on the basis of the detected collision in order to influence a collision-related motion of the loading area relative to the vehicle body, on which it is mounted, opposite to the adjusting direction, especially to respectively decelerate or slow down a collision-related displacement of the loading area toward the front of the vehicle in a controlled fashion. A force exerted by the actuator upon the loading area in the adjusting direction can be respectively increased or decreased on the basis of a detected collision, particularly when it is detected that a collision has taken place, namely increased, in particular, to at least twice, especially to at least four-times, or reduced, in particular, to no more than half, especially no more than one quarter, of the maximum or average force exerted upon the loading area by the actuator prior to the imminent collision, in order to suitably influence, particularly decelerate, the collision-related motion of the loading area relative to the vehicle body opposite to the adjusting direction.

In an embodiment, the system is configured to determine a current acceleration of the vehicle body and/or the loading area. The controller is configured to drive this actuator on the basis of the determined current acceleration in order to influence a collision-related motion of the loading area relative to the vehicle body, on which it is mounted, opposite to the adjusting direction, especially to respectively decelerate or slow down a collision-related displacement of the loading area toward the front and/or the side of the vehicle in a controlled fashion. A force exerted by the actuator upon the loading area in the adjusting direction can be predefined, in particular, on the basis of the determined current acceleration, especially proportional to a determined current acceleration, or the actuator can be driven accordingly.

In an embodiment, the loading area features a one-part or multi-part safety device, which is respectively arranged stationary referred to the loading area or on the loading area and can be moved relative to the vehicle body together with the loading area, particularly a safety belt for separably securing, especially fastening, a live load, particularly an occupant of the vehicle seat, on the loading area. In this way, the live load, particularly an occupant, can in an embodiment be moved by the actuator together with the loading area or a motion of the live load can be influenced, particularly decelerated, by the actuator.

A controller in the context of the present disclosure may be implemented in the form of hardware and/or software technology and feature, in particular, a digital processing unit, especially a microprocessor unit (CPU) that preferably is data-linked or signal-linked to a storage system and/or bus system and/or one or more programs or program modules. The CPU may be designed for processing commands implemented in the form of a program stored in a storage system, for acquiring input signals from a data bus and/or for sending output signals to a data bus. A storage system may feature, in particular, one or more different storage mediums, especially optical storage mediums, magnetic storage mediums, solid-state storage mediums and/or other non-volatile mediums. The program may be realized in such a way that it embodies or is able to carry out the methods described herein such that the CPU can execute the methods and, in particular, thereby control, especially regulate, the actuator.

BRIEF DESCRIPTION OF THE DRAWINGS

The present disclosure will hereinafter be described in conjunction with the following drawing figures, wherein like numerals denote like elements.

FIG. 2 shows a flowchart of a method according to an embodiment of the present disclosure.

DETAILED DESCRIPTION

Figure 1:
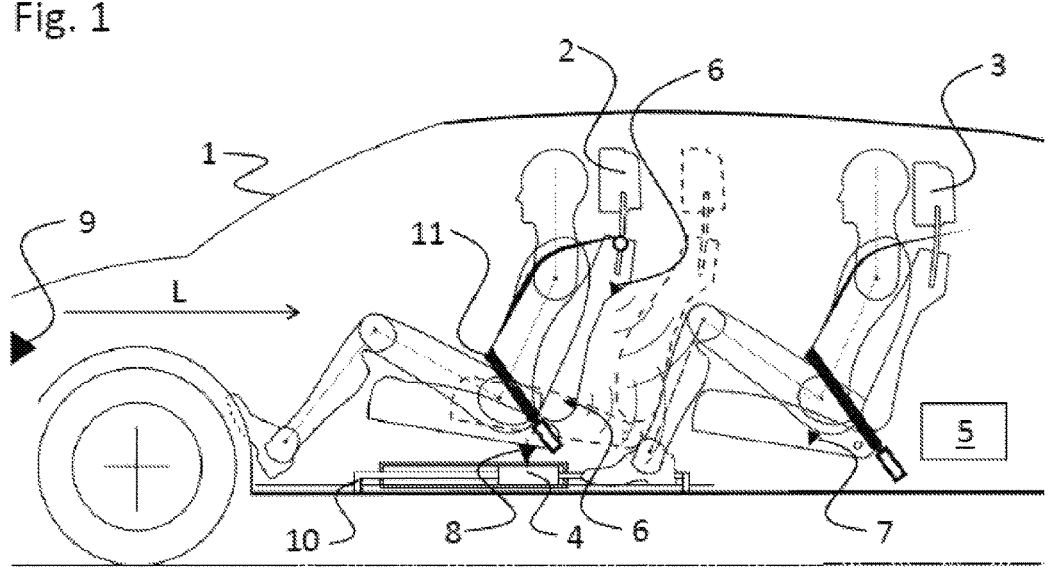
FIG. 1 shows a motor vehicle with a system according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a motor vehicle according to an embodiment of the present disclosure with a vehicle body 1, a front vehicle seat 2, which is mounted on the vehicle body 1 such that it can be adjusted on guide rails from a front end of the vehicle to a tail end of the vehicle toward the right in FIG. 1 in an adjusting direction extending in a longitudinal vehicle direction L, an additional rear vehicle seat 3, a controlled actuator 4 for exerting forces upon the front vehicle seat 2 in the longitudinal vehicle direction or adjusting direction L, as well as a system with means configured to drive the actuator 4 in the form of an electronic control unit or (ECU) or simply a controller 5 that is signal-linked to the actuator 4 and designed with corresponding program technology for carrying out a method described herein. The front vehicle seat 2, which can be adjusted on guide rails, features a safety device that is arranged stationary referred to the vehicle seat or on the vehicle seat 2 and can be moved relative to the vehicle body 1 together with this vehicle seat, namely in the form of a safety belt for detachably securing an occupant.

The system is configured to determine a permissible resetting distance of the front vehicle seat 2 in the longitudinal vehicle direction or adjusting direction. The system includes an interior monitoring system 6 arranged on the rear side of the front vehicle seat and/or a seat occupancy detection system 7 for the additional rear vehicle seat 3, which are signaled-linked to the ECU 5. The system is configured determine the weight of an occupant of the front vehicle seat 2. The system includes a force measuring device 8 on the front vehicle seat 2, which is signaled-linked to the ECU 5. The system is also configured with a detector 9 for the radar-assisted detection of an imminent collision and for detecting an acceleration of the vehicle body 1. The detector 9 is also signaled-linked to the ECU 5. The system is also configured with a sensor 10 to determine an initial position of the front vehicle seat 2 before an acceleration of the vehicle seat 2 in the longitudinal vehicle direction or the adjusting direction prior to an imminent collision. The sensor 10 is likewise signaled-linked to the ECU 5.

A method according to an embodiment of the present disclosure, which is carried out by the system, particularly its ECU 5 designed with corresponding program technology, is elucidated in greater detail below with reference to FIG. 2. In a first block S10, the weight of an occupant of the front vehicle seat 2 is determined, in particular, before or when beginning to drive.

In a subsequent block S20, an initial position and a permissible resetting distance of the front vehicle seat 2 are determined, in particular continuously or periodically. As an example, FIG. 1 shows corresponding radiation of the interior monitoring system 6, wherein the vehicle seat 2, which was adjusted in the longitudinal vehicle direction or adjusting direction L by the determined maximum permissible resetting distance, is also indicated with broken lines in this figure.

In a block S30, an imminent collision of the motor vehicle is detected. The method returns to block S20 as long as no imminent collision is detected (S30: "N"). If an imminent collision of the motor vehicle is detected in block S30 (S30: "Y"), the actuator 4 is driven in block S40 in order to accelerate the front vehicle seat 2 in the longitudinal vehicle direction or adjusting direction L (toward the right in FIG. 1).

In this case, the ECU 5 drives the actuator 4 on the basis of the determined occupant weight, the determined permissible resetting distance and the determined time until the collision such that the absolute speed of the vehicle seat 2 is minimized and/or the extended resetting distance is maximized, but not exceeded, in the pre-calculated instant of the collision as indicated with broken lines in FIG. 1.

As soon as it is detected that a collision has taken place (S50: "Y") on the basis of the determined current acceleration, the ECU 5 drives the actuator 4 on the basis of the determined current acceleration and a predefined maximum acceleration, the determined occupant weight and the determined initial position in a subsequent block S60 in order to decelerate a collision-related motion of the vehicle seat 2 relative to the vehicle body 1, on which it is mounted, opposite to the longitudinal vehicle direction or adjusting direction L in a controlled fashion. In this case, the ECU 5 drives the actuator 4 past a collision-related standstill of the motor vehicle, especially also during a subsequent positive acceleration of the vehicle body 1 in the longitudinal vehicle direction or adjusting direction L, in order to at least partially compensate a rebound.

In a block S60, the ECU 5 drives the actuator 4 in such a way that the vehicle seat 2 does not overshoot the determined initial position as a result of the collision. In this case, it controls the actuator 4 on the basis of the determined occupant weight in such a way that the collision-related forward displacement of the vehicle seat 2 follows a predefined profile, especially such that a predefined permissible acceleration is not exceeded. In a modified embodiment, the ECU 5 may in block S60 also control the actuator 4 in such a way that the vehicle seat 2 overshoots the determined initial position, particularly by no more than a predefined distance, as a result of the collision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling an actuator for exerting forces upon a loading area mounted on a vehicle body of a motor vehicle, the method comprising:
   detecting an imminent collision of the motor vehicle prior to an impact;
   driving the actuator to accelerate the loading area in a first direction prior to the impact when the imminent collision is detected, wherein the first direction is along a longitudinal axis of the vehicle body opposite a traveling direction of the motor vehicle; and
   driving the actuator to decelerate the loading area in a second direction opposite the first direction along the longitudinal axis upon impact.

2. The method according to claim 1, further comprising driving the actuator in the first direction to decelerate a motion of the loading area relative to the vehicle body after a collision-related standstill of the motor vehicle to at least partially compensate for a rebound thereof.

3. The method according to claim 1 comprising determining a permissible resetting distance of the loading area in the first direction, and driving the actuator based on the predetermined resetting distance.

4. The method according to claim 3, further comprising driving the actuator based on the determined permissible resetting distance in order to minimize an absolute speed of the loading area upon the impact.

5. The method according to claim 3, further comprising driving the actuator based on the determined permissible resetting distance to maximize the permissible resetting distance upon the impact.

6. The method according to claim 1, further comprising determining a weight of a live load on the loading area, and driving the actuator based on the determined weight of the live load.

7. The method according to claim 1, further comprising driving the actuator based on a predefined permissible acceleration.

8. The method according to claim 1, further comprising determining an initial position of the loading area, and driving the actuator based on the determined initial position.

9. A system for exerting forces upon a vehicle seat mounted on a vehicle body of a motor vehicle, the system comprising:
   a sensor configured to detect an imminent collision of the motor vehicle prior to an impact;
   an actuator configured to exert forces upon the vehicle seat in a first direction, wherein the first direction is along a longitudinal axis of the vehicle body opposite a traveling direction of the motor vehicle; and
   a controller configured to drive the actuator in order to accelerate the vehicle seat in the first direction prior to the impact when the imminent collision is detected and to drive the actuator to decelerate the vehicle seat in a second direction opposite the first direction along the longitudinal axis upon impact.

10. The system according to claim 9 wherein the controller is configured to drive the actuator in the first direction to decelerate a motion of the vehicle relative to the vehicle body after a collision-related standstill of the motor vehicle to at least partially compensate for a rebound thereof.

11. The system according to claim 9, further comprising a position sensor configured to determine a permissible resetting distance of the vehicle seat, wherein the controller is configured to drive the actuator based on the determined permissible resetting distance.

12. The system according to claim 11, wherein the controller is configured to drive the actuator in order to minimize an absolute speed of the vehicle seat upon the impact.

13. The system according to claim 11, wherein the controller is configured to drive the actuator in order to maximize the permissible resetting distance upon the impact.

14. The system according to claim 9, further comprising a weight sensor configured to determine a weight of a load on the vehicle seat, wherein the controller is configured to drive the actuator based on the weight of the load.

15. The system according to claim 9, further comprising a position sensor configured to determine an initial position of the vehicle seat, wherein the controller is configured to drive the actuator based on the determined initial position.

16. A motor vehicle comprising:
a vehicle body having a vehicle seat adjustably mounted thereon for movement in a first direction, wherein the first direction is along a longitudinal axis of the vehicle body opposite a traveling direction of the motor vehicle;
a position sensor configured to determine an initial positon of the vehicle seat on the vehicle body;
an actuator operably coupled between the vehicle body and the vehicle seat for exerting forces upon the vehicle seat in the first direction and in a second direction opposite the first direction along the longitudinal axis; and
a controller configured to:
  detect an imminent collision of the motor vehicle prior to an impact; and
  drive the actuator from the initial position for a permissible resetting distance in the first direction for accelerating the vehicle seat prior to the impact when the imminent collision is detected; and
  drive the actuator to decelerate the vehicle seat in the second direction opposite the first direction along the longitudinal axis upon impact.

* * * * *